United States Patent [19]

Novak et al.

[11] Patent Number: 5,371,143

[45] Date of Patent: Dec. 6, 1994

[54] POLYMER BLEND COMPOSITION OF FLUORINATED ELASTOMERS, THERMOPLASTIC POLYMERS AND THERMOPLASTICS ELASTOMERS

[75] Inventors: Charles T. Novak, Woodbury; Paul N. Nelson, Eagan; Sehyun Nam, Woodbury; William DeMoully, Maplewood; Kenneth D. Goebel, St. Paul, all of Minn.

[73] Assignee: Minnesota Mining and Manufacturing Company, St. Paul, Minn.

[21] Appl. No.: 900,992

[22] Filed: Jun. 18, 1992

Related U.S. Application Data

[63] Continuation-in-part of Ser. No. 599,138, Oct. 17, 1990, abandoned, which is a continuation-in-part of Ser. No. 438,521, Nov. 16, 1989, abandoned.

[51] Int. Cl.$^5$ ................ C08L 27/12; C08L 67/00; C08L 77/12
[52] U.S. Cl. ........................................ 525/88; 525/63; 525/89; 525/92; 525/165; 525/166; 525/167; 525/178; 525/179
[58] Field of Search ............... 525/178, 88, 92, 89, 525/165, 166, 167

[56] References Cited

U.S. PATENT DOCUMENTS

| | | | |
|---|---|---|---|
| 2,968,649 | 1/1961 | Pailthorp et al. | 260/80.5 |
| 2,998,397 | 8/1961 | Riesing | 525/178 |
| 3,051,677 | 8/1962 | Rexford | 260/29.6 |
| 3,318,854 | 5/1967 | Honn et al. | 260/87.7 |
| 3,655,727 | 1/1970 | Patel et al. | 260/470 |
| 3,686,143 | 8/1972 | Bowman | 260/47 |
| 3,712,877 | 1/1973 | Patel et al. | 260/87.7 |
| 3,752,787 | 8/1973 | de Brunner | 260/41 |
| 3,826,774 | 7/1974 | Demillecamps et al. | 525/178 |
| 3,857,807 | 12/1974 | Kometani et al. | 260/29.6 |
| 3,876,654 | 8/1975 | Pattison | 260/38 |
| 3,908,038 | 9/1975 | Nienart et al. | 427/27 |
| 3,933,732 | 1/1976 | Schmiegel | 260/42.27 |
| 4,130,535 | 12/1978 | Coran et al. | 260/33.6 |
| 4,158,678 | 6/1979 | Tatemoto et al. | 260/884 |
| 4,233,421 | 11/1980 | Worm | 525/343 |
| 4,259,463 | 3/1981 | Moggi et al. | 525/331 |
| 4,263,414 | 4/1981 | West | 525/102 |
| 4,287,320 | 9/1981 | Kolb | 525/340 |
| 4,358,559 | 11/1982 | Holcomb et al. | 524/380 |
| 4,395,512 | 7/1983 | Kubota et al. | 524/413 |

(List continued on next page.)

FOREIGN PATENT DOCUMENTS

| | | |
|---|---|---|
| 0168020 | 7/1985 | European Pat. Off. . |
| 0320894A2 | 12/1988 | European Pat. Off. . |
| 432911A1 | 6/1992 | European Pat. Off. . |
| 52131 | 9/1988 | Hungary . |
| 0064813 | 4/1985 | Japan . |
| 62-14574 | 4/1987 | Japan . |
| 62-218446 | 9/1987 | Japan . |
| 63-81159 | 4/1988 | Japan . |

OTHER PUBLICATIONS

'tpe'90 conference proceedings'Schotland Business Research Inc., Dearborn US-'Fluorelastomer thermoplastic blends . a new class of high performance tpe's'; Kenneth Goebel, Sehyun Nam, pp. 55–81 (Apr. 1990).

(List continued on next page.)

Primary Examiner—Ana L. Carrillo
Attorney, Agent, or Firm—Gary L. Griswold; Walter N. Kirn; Eloise J. Maki

[57] ABSTRACT

Fluorine-containing thermoplastic elastomeric compositions comprising: (A) a continuous phase comprising: (1) about 0 to 90 weight percent of thermoplastic polymer having a melt temperature or glass transition temperature greater than about 150° C., and (2) about 10 to 100 weight percent of block thermoplastic elastomer having a melt temperature greater than about 150° C.; and (B) a disperse phase comprising particles or domains of cured, fluoroelastomer composition. Such compositions are preferably prepared by dynamically vulcanizing the ingredients of the fluorine-containing thermoplastic elastomeric composition.

20 Claims, 2 Drawing Sheets

U.S. PATENT DOCUMENTS

| | | | |
|---|---|---|---|
| 4,433,104 | 2/1984 | Giles, Jr. | 525/100 |
| 4,446,270 | 5/1984 | Guenthner et al. | 524/433 |
| 4,472,557 | 9/1984 | Kawashima et al. | 525/276 |
| 4,501,858 | 2/1985 | Moggi | 525/340 |
| 4,564,662 | 1/1986 | Albin | 526/247 |
| 4,673,715 | 6/1987 | Caywood, Jr. | 525/340 |
| 4,713,418 | 12/1987 | Logothetis et al. | 525/200 |
| 4,748,208 | 5/1988 | Kasahara et al. | 525/151 |
| 4,762,891 | 8/1988 | Albin et al. | 525/276 |
| 4,777,214 | 10/1988 | Petersen | 525/146 |
| 4,816,516 | 3/1989 | Yamaya et al. | 525/180 |
| 4,833,212 | 5/1989 | Yamada et al. | 525/359.2 |
| 4,882,390 | 11/1989 | Grootaert et al. | 525/326.3 |

OTHER PUBLICATIONS

"Fluorinated Elastomers", A. C. West and A. G. Holcomb, Kirk–Othmer, Encyclopedia of Chemical Technology, vol. 8, pp. 500–515, 3rd ed.

"Rubber–Thermoplastic Compositions", Part I, Rubber Chemistry * Technology, vol. 53, p. 141 FF, Rubber Division, American Chem. Society.

"Thermoplastic Elastomers Based on Elastomer–Thermoplastic Blends Dynamically Vulcanized", Thermoplastic Elastomers, a Comprehensive Review, Chapt. 7, p. 133 FF, A. Y. Coran.

"Properties of Polymer Blends Based on Poly(Vinyl Chloride) and Fluoroelastomers", P. M. Chacatrjan, V. A. Voskresenskij, R. S. Kisele and Ju. V. Zelenev, Acta Polymerica 37 (#7), pp. 464–467.

"Engineering Plastics", Kirk–Othmer, Encyclopedia of Chemical Technology, vol. 9, p. 118 FF, 3rd ed.

"Fluoroelastomers, The Effect of Polymeric Additives on Curing Behavior", G. Moggi, International Rubber Conference Oct. 15–18, 1985 Japan.

"Thermoplastic Elastomers", Kirk–Othmer, Encyclopedia of Chemical Technology, vol. 8, pp. 626–640, 3rd ed., John wiley & Sones, 1979.

Flesher, J. R. Jr. "Polyether Block Amide: High-Performance TPE," Modern Plastics, vol. 64, pp. 100–110, Sep. 1987.

Reisch, M. S., "Thermoplastic Elastomers Bring New Vigor to Rubber Industry," Chemical & Engineering News, vol. 70, pp. 29–42, May 4, 1992.

Nicholas, P. P., Luxeder, A. M., Brooks, L. A., Hommes, P. A., "Antioxidant and Antiozoants", Kirk–Othmer, Encyclopedia of Chemical Technology, vol. 3, pp. 128–142, 3rd ed., John Wiley & Sones, 1978.

POLYMER BLEND COMPOSITION OF FLUORINATED ELASTOMERS, THERMOPLASTIC POLYMERS AND THERMOPLASTICS ELASTOMERS

This application is a continuation-in-part application of U.S. Ser. No. 07/599,138, filed Oct. 17, 1990, now abandoned, which is a continuation-in-part application of U.S. Ser. No. 07/438,521, filed Nov. 16, 1989, now abandoned.

FIELD OF THE INVENTION

This invention relates to polymer blend compositions. More particularly, this invention relates to blends comprising fluorinated elastomers, hydrocarbon thermoplastic polymers and hydrocarbon thermoplastic elastomers. In another aspect, this invention relates to processes for preparing such compositions and to processes of molding or shaping articles prepared from such compositions.

BACKGROUND OF THE INVENTION

Fluorinated elastomers are known materials and include elastomers such as fluorocarbon elastomers, fluorinated thermoplastic elastomers, fluorosilicone elastomers, and phosphonitrilic fluoroelastomers. See for example, West, A. C. and Holcomb, A. G., "Fluorinated Elastomers", Kirk-Othmer, *Encyclopedia of Chemical Technology*, Vol. 8, pp. 500–515, 3rd ed., John Wiley & Sons, 1979 and also U.S. Pat. No. 4,158,678 (Tatemoto et al.), incorporated herein by reference.

Fluorinated elastomers are thermally stable and exhibit chemical- and solvent-resistance. Such elastomers have many valuable industrial uses, such as O-rings, seals, gaskets, hoses, etc. However, the elastomers are costly, and the route to finished rubber products can be complex, often requiring preliminary mixing of fillers, curatives and other adjuvants with the elastomer gum. Also, additional shaping of certain articles, e.g., hoses, is required prior to vulcanization. The cure process can generate considerable quantities of non-reusable scrap and, in addition, cured articles cannot be reprocessed, e.g., by injection molding or extrusion.

In contrast, engineering thermoplastics such as nylons, acetals, polyesters, polyphenylenes, and polycarbonates, and specialty thermoplastics such as polysulfones, aromatic polyesters and polyamide imides are readily processable and reprocessable, e.g., by injection molding or extrusion. They show a good balance of high tensile properties, compressive and shear strength, impact resistance, and retain their properties over a wide range of environmental conditions. However, these materials do not have elastomeric properties. See, for example, "Engineering Plastics", Kirk-Othmer, *Encyclopedia of Chemical Technology*, Vol. 9, p. 118 ff, 3rd ed., John Wiley & Sons, 1979.

Thermoplastic elastomers are known materials possessing both elastomeric and thermoplastic characteristics. These materials are becoming increasingly popular in industrial applications because of their ease of fabrication and general good physical properties. Thermoplastic elastomers are of two main types, (1) block and graft copolymers containing elastomeric and plastic polymer chain segments, and (2) blends of certain elastomers and thermoplastics. Examples of the latter class include blends of hydrocarbon elastomer and thermoplastic polymer such as blends of ethylene/propylene rubber (EPDM) with polyolefin thermoplastics, such as polypropylene or polyethylene. See for example, Coran, A. Y. and Patel, R., "Rubber-Thermoplastic Compositions., Part I," Rubber Chemistry and Technology, Vol. 53, p. 141 ff, Rubber Division, American Chemical Society, 1980; and also U.S. Pat. No. 4,130,535 (Coran et al.). The elastomer blend component is often crosslinked to promote elasticity and improve the properties of the thermoplastic elastomer, such as reduced permanent set, improved ultimate mechanical strength, improved fatigue resistance, greater resistance to attack by fluids, improved high-temperature utility, etc. They can also be rapidly fabricated into finished parts using thermoplastic processing equipment, and vulcanization during fabrication into finished parts is not required. See, for example, Coran, A. Y., "Thermoplastic Elastomers Based on Elastomer-Thermoplastic Blends Dynamically Vulcanized", Thermoplastic Elastomers: A Comprehensive Review, Chapter 7, p. 133 ff, Edited by Legge, N. R., et al., Hanser Publishers, 1987.

Although the thermoplastic elastomers described above have many desirable properties, there is a need for thermoplastic elastomers with increased high temperature performance and improved fluid resistance (e.g., oil and alcohol resistance) that are easy to process (e.g., by extrusion or injection molding).

European Patent Application No. 432 911 A1, published Jun. 19, 1991 describes certain fluorine-containing compositions comprising 50 to about 90 weight percent of crosslinkable fluorinated elastomer and 10 to about 50 weight percent of essentially fluorine-free thermoplastic polymer having a melt temperature or glass transition temperature greater than about 150° C. The fluorinated elastomer may be present in the composition in a separate phase in a cured or partially cured form. One disadvantage of some of these compositions is that their viscosities are sufficiently high that they are difficult to extrude or injection mold.

Japanese Patent Application No. JP63-81159 (Ono et al.) discloses a thermoplastic elastomeric composition comprised of (A) 99–1 wt. % polyetherester amide (a thermoplastic elastomer), and (B) 1–99 wt. % rubber components selected from acrylic rubber, conjugated diene-vinyl cyan rubber and hydro-rubber, and fluoro rubber. The fluoro rubber includes copolymers of vinylidene fluoride and hexafluoropropylene. Although the application states that the thermoplastic elastomeric composition can be cured, it does not describe compositions containing a cured fluoro rubber phase dispersed in a continuous thermoplastic polymer phase.

Thermoplastic elastomers having good chemical resistance, thermal stability and processability are desirable, yet such materials have not been readily available. Thus, it would be useful to develop a thermoplastic elastomeric composition possessing all such properties.

SUMMARY OF THE INVENTION

In accordance with the present invention there are provided fluorine-containing, thermoplastic elastomeric compositions (hereinafter, for brevity, occasionally referred to as "FTPE" compositions) consisting essentially of:

(A) a continuous phase comprising the minor portion (i.e., about 10 to 50 weight percent) of the composition by weight, the continuous phase comprising:
  (1) about 0 to 90 weight percent (based on the total weight of the continuous phase) of thermoplastic polymer having a melt temperature or glass transition temperature greater than about 150° C. (and preferably greater than about 180° C.), and
  (2) about 10 to 100 weight percent of thermoplastic elastomer having a melt temperature greater than about 145° C.; and (B) a disperse phase comprising the major portion (i.e., 50 to 90 weight percent) of the composition by weight, the disperse phase comprising particles or domains of cured, fluorinated elastomer composition.

The FTPE compositions exhibit the processing characteristics of thermoplastic materials while providing the properties of fluoroelastomers (e.g., flexibility, elastomeric character and chemical and thermal resistance). The compositions can be easily molded (e.g., injection molded or extruded) because of their relatively low viscosities, into any desired shape and configuration in a manner similar to conventional thermoplastics.

Because the compositions of this invention can be handled and processed using methods similar to those employed with conventional thermoplastic materials, the speed of processing is more rapid than is possible using thermosetting fluorinated elastomer compositions alone, and the compositions are reprocessable, i.e., they can be molded, extruded, or otherwise recycled without chemical modification. Thus, shaped or scrap material of the composition may be cut or ground in order to obtain the desired pellet size and then it can simply be fed to the processing equipment (e.g., molder or extruder) in normal fashion.

Other advantages of the blend compositions of the invention will be apparent from the following detailed description.

DETAILED DESCRIPTION OF THE INVENTION

The morphology of the FTPE compositions of this invention can be complex. Typical FTPE compositions have a continuous phase comprising a mixture, blend or alloy of thermoplastic elastomer, and optionally, thermoplastic polymer. Preferably, the continuous phase consists essentially of a mixture, blend or alloy of thermoplastic polymer, thermoplastic elastomer, and flow enhancer. On a molecular level, the continuous phase may contain regions that are relatively crystalline and relatively amorphous in character. The presence of these regions may be due to the crystalline or amorphous character of the thermoplastic elastomer and/or thermoplastic polymer. If present, such regions are considered to be part of the continuous phase.

The FTPE compositions also comprise a disperse phase comprising particles or domains of cured, fluoroelastomer composition. The "disperse phase" of the FTPE composition is defined as all those particles or domains dispersed in the continuous phase with the exception of the aforementioned crystalline and/or amorphous regions and any particles or domains of thermoplastic polymer or thermoplastic elastomer. Generally, the particles or domains of the disperse phase have an average particle size of less than 20 microns and preferably, the average particle size is 0.5 to 5 microns. Preferably, the disperse phase predominantly comprises particles or domains of cured, fluoroelastomer composition, but a small amount of the disperse phase comprises particles or domains of ingredients of the FTPE composition which are insoluble in, or incompatible with the continuous phase. For example, pigments, fillers or reinforcing agents (e.g., carbon black) and inorganic acid acceptors (e.g., calcium oxide and calcium hydroxide) may constitute domains or particles of the disperse phase. Preferably, the disperse phase will consist essentially of particles or domains of cured, fluoroelastomer composition and only a small amount (e.g., less than 10 percent) of domains or particles of other incompatible or insoluble materials.

Figure 1:
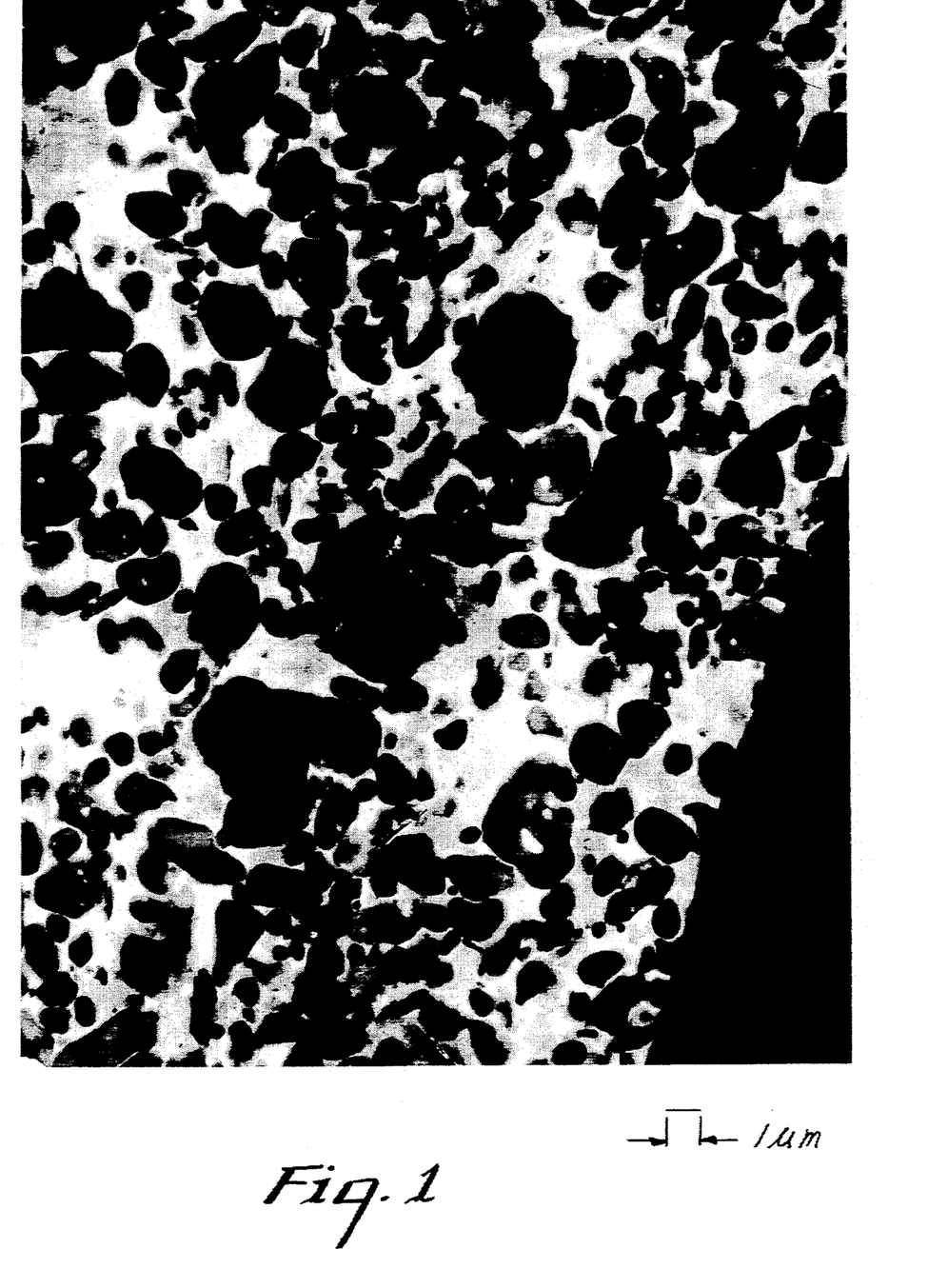
FIG. 1 is reproduced from a transmission electron photomicrograph and shows a cross-sectional view of a sample prepared from one of the compositions of this invention. The magnification is about 6000X. The composition shown in this figure has a disperse phase with an average particle size of less than five microns.
Figure 2:
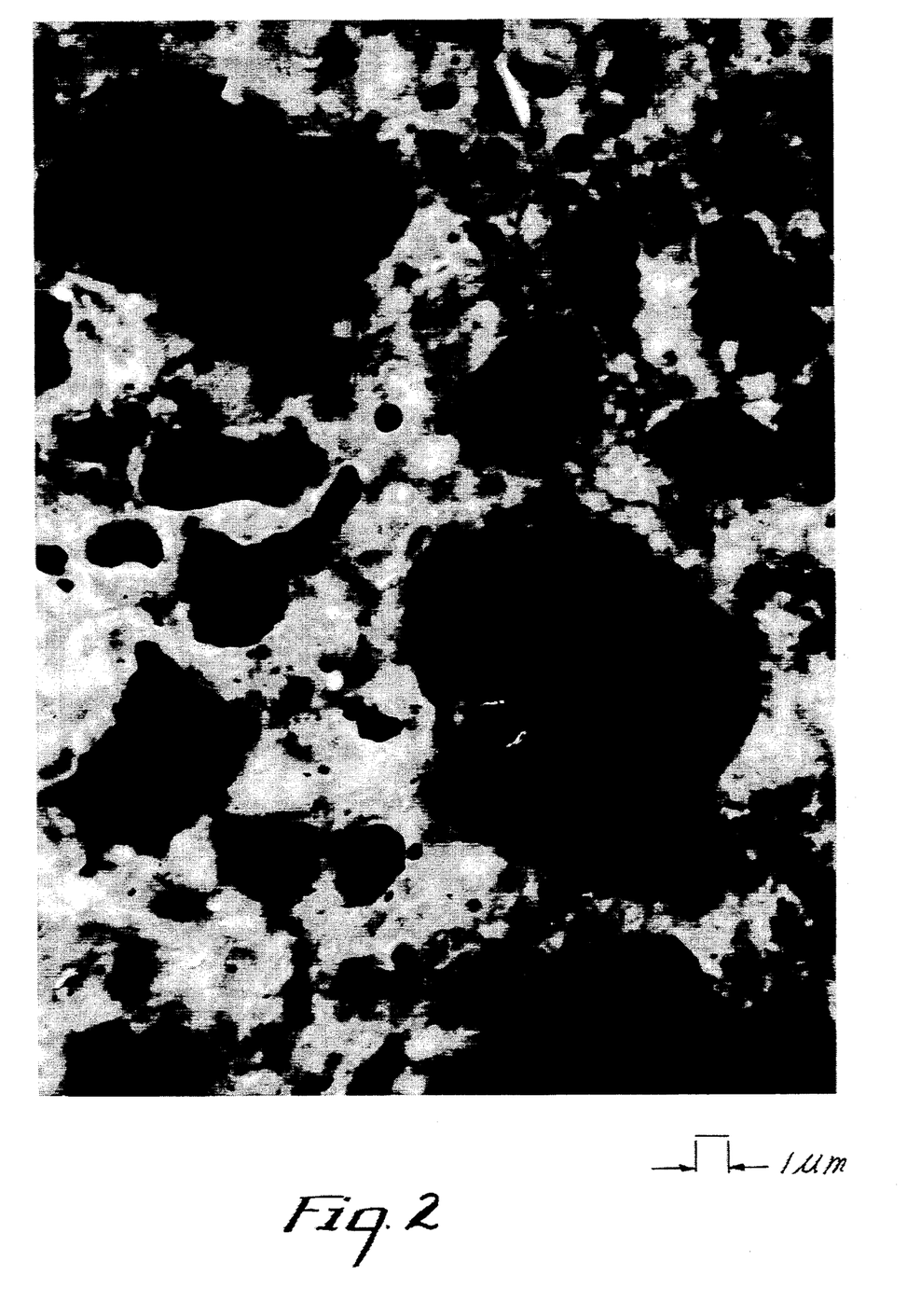
FIG. 2 is reproduced from a transmission electron photomicrograph and shows a cross-sectional view of a sample prepared from one of the compositions of this invention. The magnification is about 6000X. The composition shown in this figure has a disperse phase with an average particle size of less than 20 microns.

FIGS. 1 and 2 are transmission electronmicrographs prepared from samples of FTPE compositions. FIG. 1 shows a FTPE composition having a disperse phase with an average particle size less than 5 microns that is predominantly constituted of domains or particles of cured, fluoroelastomer composition. FIG. 2 shows a FTPE composition having a disperse phase with an average particle size less than 20 microns. The FTPE composition of FIG. 2 appears to contain a larger proportion of carbon black and acid acceptor particles dispersed in the continuous phase than the FTPE composition of FIG. 1. While it is not fully understood why, it has been determined that the FTPE composition shown in FIG. 1 has higher elongation, lower viscosity and better thermal stability than the FTPE composition shown in FIG. 2.

The continuous phase comprises a minor portion (i.e., 10 to 50 percent) of the composition by weight. The continuous phase of the FTPE composition comprises 0 to 90 weight percent thermoplastic polymer and 10 to 100 weight percent thermoplastic elastomer. Preferably, the continuous phase comprises 20 to 75 weight percent thermoplastic polymer and 25 to 80 weight percent thermoplastic elastomer. FTPE compositions prepared using the aforementioned proportions of thermoplastic polymer and thermoplastic elastomer will have surprisingly lower viscosities and will be softer than compositions prepared without the thermoplastic elastomer. The lower viscosity of the composition improves its processability by making it easier to extrude or mold, and the lower hardness makes the extruded or molded FTPE composition more resilient and flexible.

The thermoplastic polymers useful in preparing the continuous phase of the FTPE compositions are essentially fluorine-free, hydrocarbon polymers and include those polymers having melting points (or glass transition temperatures) greater than about 150° C., and preferably greater than 180° C. Many of such polymers are known and are commercially available. Mixtures or blends of two or more thermoplastic polymers may also be used in this invention.

Representative classes of useful thermoplastic polymers include, for example, polyamides (e.g., nylon 6, nylon 11, nylon 12, nylon 66, nylon 46, nylon 610, nylon 612, etc.), polyesters, polyimides, polyamideimides, polysulfones, polyetherimides, polycarbonates, polyethersulfones, polyetherketones, polyphenylenes, polyphenylene sulfides, polyphenylene oxides, polyether ether ketones and mixtures thereof.

Table 1 lists some of such suitable thermoplastic polymers along with vendor or commercial source, known trade names, and their glass transition and melt temperatures.

TABLE 1

| Polymer | Tradename | Source | Tg, °C. | Tm, °C. |
|---|---|---|---|---|
| Polyphenylene sulfide | — | Aldrich | 150 | 285 |
| Polyphenylene ether sulfone[a] | VICTREX | ICI Americas | 224 | — |
| Polysulfone[a] | UDEL | Amoco | 190 | — |
| Polyetherimide[a] | ULTEM | GE Plastics | 217 | — |
| Polycarbonate | — | Aldrich | 150 | 267 |
| Polydimethylphenylene oxide | — | Aldrich | 211 | 268 |
| Polyetheretherketone | VICTREX | ICI Americas | 143 | 344 |
| Nylon 6[b] | ULTRAMID | BASF | 62.5 | 220 |
| Nylon 66[c] | VYDYNE | Monsanto | 45 | 267 |
| Nylon 11[d] | RILSAN | Atochem | 46 | 186 |
| Nylon 610[e] | TEXALON 1600 | Texapol | 40 | 215 |
| Nylon 612[f] | TAXALON 1800 | Texapol | — | 207 |
| Poly-1,4-butylene terephthalate | VALOX 315 | GE | — | 245 |

Notes to Table 1
[a]Amorphous thermoplastic polymers that exhibit only a glass transition, i.e., softening temperature.
[b]Poly(caprolactam) having the repeating backbone units $[-NH(CH_2)_5CO-]_n$.
[c]Poly(hexamethylene adipamide) having the repeating backbone units $[-NH(CH_2)_6NHCO(CH_2)_4CO-]_n$.
[d]Poly(undecaneamide) having the repeating backbone units $[-NH(CH_2)_{10}CO-]$.
[e]Poly(hexamethylene sebacamide) having the repeating backbone units $[-NH(CH_2)_6NHCO(CH_2)_8CO-]n$.
[f]Poly(hexamethylene dodecanediamide) having repeating backbone units of the structure, $[-NH(CH_2)_6NHCO(CH_2)_{10}CO-]_n$.

In addition to the thermoplastic polymer, the continuous phase of the FTPE composition also contains thermoplastic elastomers (hereinafter, for brevity, occasionally referred to as "TPEs"). The TPEs used in this invention are essentially fluorine-free copolymers having crystalline or "hard" segments and amorphous or "soft" segments. Examples of such polymers include block copolymer thermoplastic elastomer and graft copolymer thermoplastic elastomers. Such polymers possess the Properties of thermoplastics (e.g., melt flow) above their melting temperatures, and the properties of elastomers (e.g., elastic memory and flexibility) below their melting temperatures. The TPEs useful in this invention are those which have melt temperatures greater than about 145° C. (and Preferably greater than about 180° C.) and lower the viscosity of the FTPE composition. Many of the TPEs useful in this invention are known and are commercially available (see, for example, Finelli, A. F. , Marshall, R. A., Chung, D. A. "Thermoplastic Elastomers", Kirk-Othmer, *Encyclopedia of Chemical Technology*, Vol. 8, pp. 626–640, 3rd ed., John Wiley & Sons, 1979; and Flesher, J. R. , Jr. "Polyether Block Amide: High-Performance TPE", *Modern Plastics*, vol. 64, pp. 100–110, September 1987; and Reisch, M. S., "Thermoplastic Elastomers Bring New Vigor to Rubber Industry", *Chemical & Engineering News*, Vol. 70, pp. 29–42, May 4, 1992, all incorporated herein by reference). Mixtures or blends of one or more thermoplastic elastomers may also be used in the invention.

Preferred classes of thermoplastic elastomers include: (1) those polymers of the "copolyester" type, e.g., those having crystalline polyester blocks and amorphous polyether blocks; and (2) those of the "polyether block" type, e.g., those having hard polyamide (e.g., nylon 6, 66, 11, 12, and 612) blocks and soft polyether blocks.

Some representative thermoplastic elastomers are listed in the Table 2 along with their approximate melting points.

TABLE 2

| TPE blocks | Tradename | Source | Tm, °C. |
|---|---|---|---|
| Polyether/polyamide | PEBAX 2533 | Atochem | 148 |
| Polyether/polyamide | PEBAX 5533 | Atochem | 168 |
| Polyether/polyamide | PEBAX 7033 | Atochem | 174 |
| Polyether/polyamide | PEBAX 4011 | Atochem | 195 |
| Polyether/polyester | HYTREL 5526 | duPont | 203 |
| Polyether/polyester | ARNITEL EM400 | Akzo | 195 |

The disperse phase will comprise the major portion (i.e., 50 to 90 weight percent) of the FTPE composition by weight. Preferably, the disperse phase will comprise about 60 to 85 weight percent of the FTPE composition, and most preferably 70 to 82 weight percent.

The particles or domains of cured, fluoroelastomer composition of the disperse phase can be prepared from a curable, fluorinated elastomer composition that comprises fluorinated elastomer, conventional fluoroelastomer curatives, and optionally, other additives, adjuvants and processing aids. The particles or domains of the cured or crosslinked fluoroelastomer composition should be present in the FTPE composition in sufficient amount to impart fluoroelastomer characteristics to the FTPE composition.

Preferably, the fluoroelastomer is cured or crosslinked dynamically while mixing the fluoroelastomer, fluoroelastomer curatives and any other additives, adjuvants and processing aids with the TPE and thermoplastic polymer (if present) at a temperature above the melting or glass transition temperatures of the TPE and thermoplastic polymer. However, acceptable results can also be achieved by: (1) cross-linking the curable fluorinated elastomer composition ex-situ using conventional techniques, (2) converting the cured composition to very small particles (e.g., average size of about 1 to 10 microns) that are fairly uniform in size (e.g., by grinding under cryogenic conditions), and (3) blending the cured, ground material into a melt of the polymers of the continuous phase until it is uniformly distributed throughout the continuous phase.

Selection of fluoroelastomer curatives will depend on the nature of the cure sites present in the polymer chains of the fluorinated elastomer (i.e., cure sites present in the backbone, in pendant groups and/or terminal groups. For example, nucleophilic curing agents such as polyhydroxy and diamine compounds can be used for curing fluorocarbon elastomers. Polyhydroxy compound curing agents and organo-onium accelerators (or co-curing agents) useful herein are described in U.S. Pat. No. 4,882,390, (Grootaert et al.) incorporated herein by reference. Alternatively, curing can also be accomplished using conventional peroxide curing agents. Some useful peroxide curing agents are described in (U.S. Pat. Nos. 4,263,414 (West) and 4,564,662 (Albin) incorporated herein by reference.

Fluorinated elastomers useful in preparing the disperse, cured phase include known fluorinated polymers or gums such as fluorocarbon elastomers (which include fluorinated thermoplastic elastomers for the purpose of this invention), fluorosilicone elastomers, and phosphonitrilic fluoroelastomers. Such elastomers are described, for example in West, A. C. and Holcomb, A. G., "Fluorinated Elastomers", Kirk-Othmer, *Encyclopedia of Chemical Technology*, Vol. 8, pp. 500–515, 3rd ed., John Wiley & Sons, 1979 and also U.S. Pat. No. 4,158,678 (Tatemoto et al.), incorporated herein by reference. Such elastomers and suitable curing systems therefor are described, for example, in U.S. Pat. No. 4,233,421 (Worm); U.S. Pat. No. 4,263,414 (Kolb); U.S. Pat. No. 4,446,270 (Guenthner); and U.S. Pat. No. 4,762,891 (Albin); U.S. Pat. No. 4,882,390 (Grootaert et al.); and references cited therein; all of which are incorporated herein by reference.

Commercially available fluorinated elastomers which are useful herein include products sold under the tradenames "FLUOREL", "KEL-F", "VITON", "TECHNOFLON", "AFLAS", "MIRAFLON" and "DAIEL". Among the polymers which may be used in accordance with this invention are the elastomeric copolymers of one or more fluoromonomers selected from the group of vinylidene fluoride, hexafluoropropene, chlorotrifluoroethylene, 2-chloropentafluoropropene, perfluorinated alkyl vinyl ether, tetrafluoroethylene, 1-hydropentafluoropropene, dichlorodifluoroethylene, trifluoroethylene, 1,1-chlorofluoroethylene, 1,2-difluoroethylene, bromotrifluoroethylene, bromodifluoroethylene, and bromotetrafluorobutene. Optionally, the aforementioned one or more fluoromonomers may be copolymerized with fluorine-free olefinic monomers such as ethylene and propylene.

The preferred elastomers are copolymers of vinylidene fluoride with at least one terminally unsaturated fluoromonoolefin containing at least one fluorine atom substituent on each double-bonded carbon atom, each carbon atom of said fluoromonoolefin being substituted only with fluorine, chlorine, hydrogen, lower fluoroalkyl radical, or lower fluoroalkoxy radical, particularly hexafluoropropene, tetrafluoroethylene, chlorotrifluoroethylene, and 1-hydropentafluoropropene. Elastomeric copolymers of hexafluoropropene and vinylidene fluoride having between about 15 and about 50 mole percent hexafluoropropene, optionally with the addition of up to 30 mole percent tetrafluoroethylene, are illustrative of this preferred class. Mixtures or blends of different fluorinated elastomers, and fluoroelastomers of different viscosities or molecular weights, are also suitable.

Peroxide curatives include organic or inorganic peroxides. Organic peroxides are preferred, particularly those which decompose at a reasonable rate at dynamic mixing temperatures. Suitable peroxides include dicumyl peroxide, 2,5-dimethyl-2,5-di(tbutylperoxy)hexane, t-butyl-hydroperoxide, di-t-butyl peroxide, t-butylperoxy benzoate, 2,5-dimethyl-2,5-di(t-butylperoxy)-hexane-3 and lauroyl peroxide. The amount of peroxide curing agent used generally will be 0.1 to 5, preferably 1 to 3 parts per 100 parts of fluoropolymer gum.

Along with the peroxide curing agent it will generally be desirable to use a cocuring agent (or coagent), such as are commonly used in peroxide vulcanization of rubbers to obtain a tighter or faster cure or better compression set. Such cocuring agents generally will be used in amount of 1 to 10, preferably 1 to 5 parts per 100 parts of the fluoropolymer gum.

Cocuring agents which can be used include triallyl cyanurate, diallyl phthalate, allyl methacrylate and, particularly, triallyl isocyanurate.

A preferred fluoroelastomer curing system comprises the combination of a polyhydroxy compound and an organo-onium compound. The polyhydroxy compound is one which is capable of functioning as a crosslinking agent for the fluorinated elastomer. Such are well-known, and are described in the art, e.g., U.S. Pat. Nos. 4,259,463 (Moggi et al.), 3,876,654 (Pattison), and 4,233,421 (Worm), and can include aromatic polyhydroxy compounds and aliphatic polyhydroxy compounds, and the derivatives of said compounds. Also, blends of polyhydroxy compounds may be used in this invention.

Specific aromatic polyhydroxy compounds include 4,4'-thiodiphenol, isopropylidene-bis(4-hydroxybenzene) (i.e., bisphenol A), hexafluoroisopropylidene-bis(4-hydroxybenzene), (i.e., bisphenol AF) and anthraflavic acid (e.g., 2,6-dihydroxyanthraquinone). Representative aliphatic polyhydroxy compounds include fluoroaliphatic diols, e.g., 1,1,6,6-tetrahydrooctafluorohexanediol, and others such as those described in U.S. Pat. No. 4,358,559 (Holcomb et al.) and references cited therein. Representative polyhydroxy derivatives of polyhydroxy compounds which can be used as crosslinking agents are described in U.S. Pat. No. 4,446,270 (Guenthner et al.), and include, for example, 2-(4-allyloxyphenyl)-2-(4-hydroxyphenyl) propane.

Preferred polyhydroxy compounds are aromatic polyhydroxy compounds such as bisphenol A and bisphenol AF. A blend of two or more of the polyhydroxy compounds can be used in this invention. When changing from one polyhydroxy compound to another in a given composition, one skilled in the art will be able to select a curing time and temperature that will give the desired rate of cure.

The organo-onium compounds are those useful as co-curing agents or vulcanization accelerators with the polyhydroxy compounds. Many of the organo-onium compounds useful in this invention are described in the art and contain at least one heteroatom (i.e., a non-carbon atom such as N, P, S, O) bonded to organic or inorganic moieties. See, for example, U.S. Pat. No. 4,882,390 (Grootaert et al); U.S. Pat. No. 3,655,727 (Patel et al.); U.S. Pat. No. 3,712,877 (Patel et al.); U.S. Pat. No. 3,857,807 (Kometani); U.S. Pat. No. 3,686,143 (Bowman); U.S. Pat. No. 3,933,732 (Schmiegel); U.S. Pat. No. 3,876,654 (Pattison); U.S. Pat. No. 4,233,421 (Worm); U.S. Pat. No. 4,259,463 (Moggi et al.); U.S. Pat. No. 4,673,715 (Caywood); U.S. Pat. No. 4,833,212 (Yamada et al.); U.S. Pat. No. 4,748,208 (Kasahara et al.); U.S. Pat. No. 4,501,858 (Moggi); U.S. Pat. No. 4,882,390; and also see West, A. C. and Holcomb, A. G. "Fluorinated Elastomers", Kirk-Othmer; *Encyclopedia of Chemical Technology*, Vol. 8, 3rd Ed., John Wiley & Sons, Inc., pp. 500–515 (1979); all of which are incorporated herein by reference. Mixtures of organo-onium compounds are also useful in this invention.

Preferably, the organo-onium compounds include quaternary organo-onium compounds (such as those selected from the group consisting of ammonium, arsonium, phosphonium, stibonium, amino-phosphonium, phosphorane and iminium compounds) and sulfonium compounds. Many of such compounds are described in U.S. Pat. No. 4,882,390 (Grootaert et al.), herein incorporated by reference.

Representative organo-onium compounds useful in this invention include: tetrabutylammonium chloride, tetrabutylammonium bromide, tetrahexylammonium chloride, tetraheptylammonium chloride, triphenylbenzylphosphonium chloride, tetrapentylammonium chloride, tributylallylphosphonium chloride, tributylbenzylphosphonium chloride, dibutyldiphenylphosphonium chloride, tetrabutylphosphonium chloride and tributyl(2-methoxy)propylphosphonium chloride, phenyltrimethylammonium chloride, tetrapropylammonium bromide, tetraheptylammonium bromide, tetramethylphosphonium chloride, tetramethylammonium chloride, tetraphenylphosphonium chloride, tetraphenylarsonium chloride, tetraphenylstibonium chloride, 8-benzyl-1,8-diazobicyclo[5.4.0]7-undecenium chloride, benzyltris(dimethylamino)phosphonium chloride, bis(benzYldiphenylphosphine) iminium chloride compounds and mixtures thereof.

A further component in the preferred curing system for the fluorinated elastomer is an acid acceptor. Acid acceptors can be inorganic or organic compounds. Organic acid acceptors include sodium stearate, and magnesium oxalate. However, acid acceptors are generally inorganic bases and include magnesium oxide, lead oxide, calcium oxide, calcium hydroxide, dibasic lead phosphite, zinc oxide, barium carbonate, strontium hydroxide, calcium carbonate, etc. The acid acceptors can be used singly or in combination and preferably are used in amounts ranging from 2 to about 30 parts per 100 parts by weight of the fluoroelastomer (i.e., "phr"). Particularly preferred compositions of this invention contain a 3:4.5 weight ratio mixture of calcium oxide and calcium hydroxide in amounts ranging from 3 to about 12 phr.

Optionally, one or more diorgano sulfur oxide compounds can be added to the FTPE compositions. When compounded with the other ingredients in the curable fluorinated elastomer composition, the diorgano sulfur oxide compounds can function to increase the cure rate of the composition. Preferably, the diorgano sulfur oxide compounds are employed in the FTPE compositions at a level of 0.2 to 5 phr. Said diorgano compounds are known in the art and are described, for example, in U.S. Pat. No. 4,287,320 (Kolb). Representative diorgano sulfur oxides include dimethylsulfone, tetramethylene sulfone (i.e., sulfolane), and bis(4-chlorophenyl) sulfone. Additional diorgano sulfur oxides are described in U.S. Pat. No. 4,287,320 (Kolb), which teachings are incorporated herein by reference.

Preferably, the FTPE composition will be prepared using one or more amine compounds. The amine compounds are those which, when incorporated into the FTPE compositions, increase the tensile strength and elongation of the FTPE compositions. The amine compounds useful in this invention contain one or more (and preferably one or two) amino nitrogen atoms and at least one aryl group (or group containing one or more aryl moieties) bonded to an amino nitrogen atom. Preferably, each amino nitrogen atom in the amino compound will be bonded to an aryl group or group containing one or more aryl moieties. However, no amino nitrogen atom in the amine compound can be directly bonded to the methylene carbon atom of an arylmethylene group.

Representative classes of useful amine compounds include diaryldiamines, diarylamines, diarylarylenediamines, dialkylarylenediamines, diarylalkylenediamines, tetraalkylarylenediamines, tetraarylarylenediamines, tetra(mixed alkyl/aryl) arylenediamines and tetra(mixed alkyl/aryl) alkylenediamines. Many of the amine compounds useful in this invention are generally known and are commercially available, see for example, Nicholas, P. P., Luxeder, A. M., Brooks, L. A., Hommes, P. A., "Antioxidant and Antiozonants", Kirk-Othmer, *Encyclopedia of Chemical Technology*, Vol. 3, pp. 128-142, 3rd ed., John Wiley & Sons, 1978, incorporated herein by reference.

A useful class of amine compounds can be represented by the following formula:

where:

$R^1$ is independently selected from substituted and unsubstituted alkyl, aryl, aralkyl, and alkaryl groups;

$R^2$ is independently selected from H, and substituted and unsubstituted alkyl, aryl, aralkyl and alkaryl groups;

$R^3$ is selected from substituted or unsubstituted arylene, alkylene, alkarylene, and aralkylene groups;

n is a number from 0 to 3;

at least one $R^1$, $R^2$ or $R^3$ group will be an aryl group or a group containing one or more aryl moieties; and no amino nitrogen atom will be bonded directly to the methylene carbon atom of an arylmethylene (e.g., benzyl) group. Examples of substitutents of the $R^1$, $R^2$ and $R^3$ groups include halogen atoms, alkyl (e.g., methyl, octyl, and t-butyl), alkoxy, alkylthio and aryl groups.

Particularly useful amine compounds are those which improve not only the tensile and elongation properties of the FTPE compositions but increase their thermal stability as well. Examples of such compounds include N,N-'di-beta-naphthyl-para-phenylene diamine (i.e., $C_{10}H_7$—NH—$C_6H_4$—NH—$C_{10}H_7$, commercially available as "AGERITE WHITE", $C_6H_5$—NH—$C_6H_4$—NH—$C_6H_5$, available, commercially as "AGERITE DPPD", both compounds available from R. T. Vanderbilt Company, Inc., $C_6H_5$—NH—$C_6H_5$ and p—Cl—$C_6H_4$—N($C_6H_5$)—$C_6H_4$—N($C_6H_5$)—$C_6H_4$—Cl—p.

The amine compound can be used in amounts ranging from 0 to 3 phr, but preferably are used in amounts ranging from 0.35 to 8 millimoles per 100 grams of fluoroelastomer gum (i.e., "mmhr").

Generally, the greatest thermal stability of the FTPE composition can be achieved by using both amine compound and a calcium oxide and calcium hydroxide mixture in the composition.

The FTPE compositions can also be prepared using other conventional pigments, adjuvants, additives and processing aids such as: fillers or reinforcing agents (e.g., carbon black, silica, etc.); flow enhancers to reduce the viscosity of the FTPE compositions (e.g., STRUKTOL TR 065, STRUKTOL TR 044 and STRUKTOL TR 016, commercially available from the Struktol Company; and heat stabilizers/antioxidants for the thermoplastic polymer (e.g., "HSN" stabilizer, an antioxidant nylon commercially available from Texapol). While any such additives, adjuvants and processing aids should be used in amounts that produce the desired effect, and such amounts are generally determined empirically for a particular FTPE composition, 0 to 30 phr of inert fillers, and 0 to 10 phr (and preferably 2 to 5 phr) of flow enhancer are useful in this invention.

Representative amounts of the components of the FTPE compositions are summarized in Table 3. Unless otherwise noted, amounts are in grams. The label "mmol" means millimoles.

TABLE 3

| Ingredient | Amount | Preferred Amount | Most Preferred Amount |
|---|---|---|---|
| Fluoroelastomer, g | 100 | 100 | 100 |
| Thermoplastic, g (optional) | 0–105 | 4–56 | 5–38 |
| Block thermoplastic elastomer, g | 1–117 | 5–60 | 6–40 |
| Thermoplastic + Block thermoplastic elastomer, g | 13–117 | 20–75 | 25–50 |
| Amine Compound, (g) mmol | (0–3) | 0.35–8.0 | |
| Polyhydroxy compound, mmol | 1–15 | 3–10 | |
| Onium compound, mmol | 0.2–10 | 1–4 | |
| Acid Acceptors, g | 2–30 | 3–12 | |
| Flow enhancers, g | 0–10 | 2–5 | |
| Filler, g | 0–30 | 1–3.5 | |

Preferably, the FTPE compositions are prepared by dynamically vulcanizing a mixture comprising the components of the curable fluoroelastomer composition, the TPE and the thermoplastic polymer (if present). The dynamic vulcanization process can be carried out using conventional batch mixers such as Brabender, Banbury or Haake Rheocord mixers, or by mixing the components of the FTPE using conventional single or twin screw extruders.

In the dynamic vulcanization process of this invention, the fluoroelastomer gum is charged to the mixer, e.g. Haake Rheocord, (which is preferably preheated to a temperature at or above the melting or glass transition temperatures of the TPE and thermoplastic polymer) either in the form of a pure gum, or preferably, in the form of a masterbatch of the gum compounded with acid acceptor, polyhydroxy crosslinking agent, amine compound (optional), and any other desirable adjuvants, additives or processing aids (with the exception of the flow enhancers). The composition is charged to the mixer. After mixing for a sufficient time to uniformly incorporate the ingredients, the TPE and thermoplastic polymer (if used) may be charged to the mixer. The organo-onium compound may then be added either concurrently with or soon after (e.g., within one to two minutes) the TPE and any thermoplastic polymer. Any flow enhancers may be added with or soon after (e.g., within one or two minutes) the organo-onium compound. The resulting composition is then mixed until the fluoroelastomer has substantially crosslinked and has formed a disperse phase of discrete particles or domains dispersed in the continuous phase. Preferably, those ingredients added before the TPE and thermoplastic polymer (if any) are thoroughly mixed before addition of the TPE and thermoplastic polymer. Thorough mixing appears to result in better incorporation of filler, inorganic acid acceptor, and other incompatible or insoluble ingredients in the particle domains of cured, fluoroelastomer composition.

Variation from the order of addition of the ingredients described herein will also provide acceptable results. The optimum order may vary with the FTPE composition and must be empirically optimized for each particular FTPE composition and mixer design. However, two important Principles in establishing the order of addition are: (1) that all of the components of the FTPE composition necessary to effect cure of the fluoroelastomer cannot be added before the TPE and thermoplastic polymer, and at least one of the ingredients necessary to effect cure of the fluoroelastomer must be reserved until after the TPE and thermoplastic polymer are added to the mixer; and (2) that with the exception of any flow enhancer and the reserved, fluoroelastomer cure system components, it is advantageous to add as many components of the FTPE composition as possible to the mixer before the TPE and thermoplastic polymer are added.

As one skilled in the art will readily recognize, the mixing times after the addition of each of the components will depend upon the size of the batch, the type of mixer used and the relative Proportions of the ingredients.

EXAMPLES

The compositions of the fluorocarbon elastomer gums used in the following examples are summarized in Table 4.

TABLE 4

| Designation | Monomer Composition, mole % | | | | Mooney Viscosity$^a$ |
|---|---|---|---|---|---|
| | $CH_2=CF_2$ | $CF_3CF=CF_2$ | $CF_2=CF_2$ | $CH_3CH=CH_2$ | |
| FE-1 | 78 | 22 | — | — | 100 |
| FE-2 | 61 | 18 | 21 | — | 75 |
| FE-3 | — | — | 53 | 47 | 160 |
| FE-4 | — | — | 53 | 47 | 95 |
| FE-5 | 78 | 22 | — | — | 50 |

$^a$ML 1 + 10 @ 121° C.

Physical Property Determination

The FTPE composition is removed from the mixer and compression molded into a smooth sheet about 2 mm thick at a pressure of 10–15 MPa and at a temperature of 230 to 250° C. and immediately cooled to a temperature sufficiently below $T_m$ to allow removal of the pressed sheet. Test specimens are cut from the smooth FTPE composition sheets and the following physical properties measured:

| Tensile Strength at Break | ASTM D412-75 |
|---|---|
| Elongation at Break | ASTM D412-75 |
| Hardness | ASTM D2240-85 |
| Compression Set | ASTM D395-85 |

Thermal Stability

The thermal stability of the composition is determined by placing a 3.0 cm×1 cm×2 mm thick sample of the composition in a circulating air oven at 260° C. Weight loss of the sample is determined after one hour in the oven and after 22 hours in the oven. The greater the weight loss of the sample after one hour and after 22 hours, the less thermally stable the composition.

EXAMPLES 1–10

These examples show the influence of various amine compounds on the physical properties and thermal stability of the FTPE compositions.

Unless otherwise noted, the amounts of the ingredients given in Table 5 are in grams.

TABLE 5

| Ingredients | |
|---|---|
| FE-1[a] | 100 |
| CaO | 3 |
| Ca(OH)$_2$ | 4.5 |
| Bisphenol AF | 1.2 |
| Tributylallyl phosphonium chloride[b] | 0.32 |
| Carbon black N-326 | 1.5 |
| Nylon 610[c] | 17 |
| PEBAX 5533[d] | 11 |
| PEBAX 2533[d] | 4 |
| TR 065[e] | 3 |
| Amine compound[f], mmol | 2.78 |

[a]Fluoroelastomer described in Table 4.
[b]Contains 0.24 g silica and 0.22 g sulfolane in addition to the tributylallyl phosphonium chloride.
[c]TEXALON 1600 available from Texapol, Inc.
[d]TPEs described in Table 2.
[e]STRUKTOL TR 065 available from this Struktol Company.
[f]The amine compounds are described in Table 6. No amine compound was used in Example 10.

TABLE 6

| Amine | Structure | MW | Source | Prod. Name |
|---|---|---|---|---|
| A1 | $C_{10}H_7$—NH—$C_6H_4$—NH—$C_{10}H_7$ | 360 | Vanderbilt | AGERITE WHITE |
| A2 | $C_6H_5$—NH—$C_6H_4$—NH—$C_6H_5$ | 260 | Vanderbilt | AGERITE DPPD |
| A3 | $CH_3(CH_2)_6$NH—$C_6H_4$—NH$(CH_2)_6CH_3$ | 304 | Pfaltz & Bauer | 026430 |
| A4 | $C_6H_5$—NH—$CH_2CH_2$—NH—$C_6H_5$ | 212 | Aldrich | D2700-4 |
| A5 | [p-Cl—$C_6H_4$—N($C_6H_5$)]$_2$—$C_6H_4$— | 481 | TCI | B1336 |
| A6 | $(CH_3)_2$N—$C_6H_4$—N$(CH_3)_2$ | 164 | Aldrich | 16020-2 |
| A7 | 4-phenylpiperidine | 161 | Aldrich | 14861-1 |
| A8 | $C_6H_5$—NH—$C_6H_5$ | 169 | Fisher | D-91 |
| A9 | $C_6H_5COO$—N=⟨⟩=N—$OCO$—$C_6H_5$ | 346 | Naugatuck | Dibenzo GMF |

The compositions of the examples were dynamically cured using a Haake Rheocord Rheometer. The Rheometer was preheated to about 230–250° C. (depending upon the thermoplastic polymer and TPE used), and the fluoroelastomer gum, acid acceptor, bisphenol and amine compound (if present) were charged to the mixer. The ingredients were then mixed about 3 minutes at 75 rpm. While continuing to mix the ingredients, the thermoplastic polymer and TPE were added. Within about one minute the organo-onium compound was added to the mixer, and about two minutes later, the TR 065 was added. Throughout this period, the mixer was running. The composition was discharged from the mixer after a total of 12 minutes.

The tensile strength, elongation at break and thermal stability of the FTPE compositions were evaluated according to the procedures described above, and the results are summarized in Table 7.

TABLE 7

| Ex. No. | Amine | Tensile strength MPa | Elongation % | Wt. Loss[a], % 1 hr | Wt. Loss[a], % 22 hrs |
|---|---|---|---|---|---|
| 1 | A1 | 16.44 | 338 | 0.9 | 5.8 |
| 2 | A2 | 15.55 | 325 | 1.2 | 6.5 |
| 3 | A3 | 15.33 | 322 | 1.5 | 11.3 |
| 4 | A4 | 10.99 | 176 | 1.6 | 10.7 |
| 5 | A5 | 9.83 | 120 | 1.5 | 6.8 |
| 6 | A6 | 9.79 | 102 | 1.4 | 7.0 |
| 7 | A7 | 8.70 | 120 | 1.7 | 9.8 |
| 8 | A8 | 9.41 | 90 | 1.5 | 5.9 |
| 9 | A9 | 8.45 | 80 | 1.7 | 9.6 |
| 10 | none | 8.29 | 73 | 1.5 | 7.6 |

[a]Measured at 260° C.

The results presented in Table 7 show that certain amine compounds improve the thermal stability, tensile strength and elongation of the FTPE compositions (see Examples 1–2, and 5–6 and 8), while others only improve tensile strength and elongation (see Examples 3–4 and 7).

EXAMPLES 1C and 11–20

The following examples illustrate the effect of various amounts of the amine compound, AGERITE DPPD (described in Table 6 as compound "A2"), on the tensile strength, elongation and thermal stability of the FTPE compositions. The compositions of Examples 1C and 11–20 were similar to that used for Example 1 except that a nylon 612 (i.e., prepared by combining TEXALON 1800 AL with of 0.34 parts of HSN stabilizer, both products commercially available from Texapol Corporation) was used in place of the nylon 610; TR 065 (2.5 g) and TR 044 (0.5 g) were used instead of 3 g of TR 065 and AGERITE DPPD was used instead of AGERITE WHITE. The FTPE compositions were prepared according to the procedure described in Examples 1–10, and the thermal stability, elongation and tensile strength of the compositions were measured according to the procedures described above and are presented in Table 8.

TABLE 8

| Ex. No. | DPPD[b] (mmhr) | Tensile Strength MPa | Elongation % | Wt. Loss[a], % 1 hr | Wt. Loss[a], % 2 hr |
|---|---|---|---|---|---|
| 1C | 0 | 7.1 | 90 | 1.3 | 6.1 |
| 11 | 0.23 | 7.4 | 89 | 0.6 | 3.4 |
| 12 | 0.35 | 10.9 | 180 | 0.5 | 2.8 |
| 13 | 0.46 | 14.6 | 371 | 1.0 | 6.9 |
| 14 | 0.61 | 11.9 | 243 | 1.0 | 5.7 |
| 15 | 0.96 | 13.1 | 321 | 0.5 | 3.0 |
| 16 | 1.92 | 13.6 | 339 | 1.0 | 5.7 |
| 17 | 2.88 | 11.3 | 260 | 1.0 | 5.4 |
| 18 | 3.85 | 13.2 | 348 | 1.1 | 5.6 |
| 19 | 5.77 | 13.4 | 370 | 1.2 | 5.6 |
| 20 | 9.62 | 7.4 | 163 | 1.8 | 10.6 |

[a]Measured at 260° C.
[b]Described in Table 6 as amine "A2".

The results show that very small amounts of the AGERITE DPPD improve the properties of the FTPE compositions, but if too much AGERITE DPPD is used thermal stability and physical properties are negatively impacted. For example, the use of more than about 8 mmhr of AGERITE DPPD adversely affects the thermal stability of the composition.

EXAMPLES 21-24 and 2C-3C

The following examples illustrate the effect on the hardness and viscosity of the FTPE compositions of adding TPE.

The compositions of these examples were similar to that used for Example 1, except that nylon 612 was used in place of nylon 610, 2.0 g of TR 065 and 1.0 g of TR 044 were used instead of TR 065 alone, 1.0 part of carbon black was used instead of 1.5 g, AGERITE DPPD (i.e., $C_6H_5$—NH—$C_6H_5$—NH—$C_6H_5$ commercially available from R. I. Vanderbilt Company, Inc.) was used instead of AGERITE WHITE and the amounts of the PEBAX and nylon are as indicated below in Table 9 (phr=parts per 100 parts of elastomer gum). The compositions were processed according to the procedure described for Examples 1-10, and the physical properties of the resulting FTPE were evaluated according to the procedures described above. The results are summarized in Table 9.

TABLE 9

| | Relative amounts of nylon and PEBAX | | Properties of FTPE composition | | |
|---|---|---|---|---|---|
| Ex. No. | Nylon[a] (%) | PEBAX[b] (%) | Total PEBAX & nylon (phr) | Shore D hardness | Viscosity, poise (240° C.) |
| | | | | | (100s$^{-1}$) (1000s$^{-1}$) |
| 2C | 100 | 0 | 26 | 56 | 18,650  4,210 |
| 21 | 95 | 5 | 30 | 56 | 16,800  3,980 |
| 22 | 70 | 30 | 32 | 49 | 9,239  1,491 |
| 23 | 53 | 47 | 32 | 42 | 8,916  1,641 |
| 24 | 30 | 70 | 32 | 35 | 6,883  1,454 |
| 3C | 0 | 100 | 32 | 33 | 7,520  1,578 |

[a]TEXALON 1800 available from Texapol Corporation.
[b]PEBAX 5533 and 2533 and described in Table 2.

The results show that addition of PEBAX to the FTPE compositions lowers both the viscosity and Shore D hardness. This is particularly surprising because PEBAX 5533 and PEBAX 2533 have viscosities (as measured at 1000 s$^{-1}$ and 240° C.) of 1600 and 1300 poise respectively, which are greater than that of Nylon 612 (450 poise, as measured at 1000 s$^{-1}$ and 240° C.).

EXAMPLES 25 AND 4C-5C

These examples show the beneficial properties provided by dynamically curing the FTPE compositions of this invention.

The composition of the Examples were similar to that of Example 1 except that the nylon 612 (i.e., TEXALON 1800, commercially available from Texapol Corporation) was used in place of nylon 610, and 1.0 g of carbon black was used instead of 1.5 g, antioxidant AGERITE DPPD (1.0 g) was used instead of AGERITE WHITE, and in the case of Example 4C, bisphenol AF was omitted from the composition, and in the case of Example 5C, tributylallyl phosphonium chloride was omitted from the composition. The thermal processing of the examples was similar to that described in Examples 1-10 and the tensile strength, elongation, compression set and viscosity were measured using the methods described above and are summarized in Table 10.

TABLE 10

| | Examples | | |
|---|---|---|---|
| Physical Properties | 25 | 4C | 5C |
| Tensile strength, MPa | 13.1 | 10.5 | 8.85 |
| Compression set, % (70 hrs @ 150° C.) | 84 | 102 | 106 |
| Viscosilty, poise (1000s$^{-1}$ @ 240° C.) | 3380 | 2767 | 2090 |

The results show that the dynamically vulcanized composition (Example 25) has greater tensile strength and lower compression set than compositions which are not dynamically cured (Examples 4C and 5C).

EXAMPLES 26-31

The following examples illustrate the utility of various thermoplastic polymers and TPEs in the FTPE compositions.

These examples illustrate the use of the thermoplastic polymer VALOX 315 (described in Table 1) and the TPE HYTREL 5526 (described in Table 2).

The compositions of Examples 26-31 were similar to that of Example 1 except that 1.5 g of carbon black was used instead of 1.0 g, and the amounts of thermoplastic polymer, TPE, TR 065 and TR 044 (commercially available from the Struktol Company) are as presented in Table 10. The compositions were processed according to the procedure described in Examples 1-10 and the physical properties of the FTPE compositions were evaluated according to the methods described above. The results are summarized in Table 11.

TABLE 11

| Examples | 26 | 27 | 28 | 29 | 30 | 31 |
|---|---|---|---|---|---|---|
| Hytrel 5526 (phr) | 32 | 32 | 16 | 16 | | |
| Valox 315[a] (phr) | | | | | 16 | 16 |
| PEBAX 2533[a] (phr) | | | 4 | 4 | 4 | 4 |
| PEBAX 7033[a] (phr) | | | 12 | 12 | 12 | 12 |
| AGERITE WHITE[b] (phr) | 1.0 | 0 | 1.0 | 0 | 1.0 | 0 |
| TR 065 (phr) | 3.0 | 3.0 | 1.5 | 1.5 | 1.5 | 1.5 |
| TR 044 (phr) | | | 1.5 | 1.5 | 1.5 | 1.5 |
| Tensile strength (MPa) | 11.5 | 4.53 | 6.87 | 4.30 | 9.05 | 5.65 |
| Elongation (%) | 310 | 80 | 215 | 84 | 248 | 98 |
| Compression set (%) (70 hrs @ 150° C.) | 57 | 74 | 72 | 78 | 71 | 76 |
| Hardness, Shore D | 36 | 33 | 33 | 32 | 38 | 38 |

[a]TPEs described in Table 2.
[b]$C_{10}H_7$—NH—$C_6H_4$—NH—$C_{10}H_7$, described in Table 6 as amine "A1".

The data show that VALOX 315 and HYTREL 5526 can be used to prepare the FTPE compositions of this invention. The data also show that the tensile strength, elongation, and compression set can be improved by addition of amine compound.

EXAMPLES 32-34

The following examples illustrate the use of various fluroelastomers in the FTPE compositions of this invention.

Example 32 uses a fluoroelastomer copolymer (vinylidene fluoride, hexafluoropropylene and tetrafluoroethylene), bisphenol AF and tributylallyl phosphonium chloride. Examples 33-34 use a copolymer (tetrafluoroethylene and propylene), and a peroxide cure system. The compositions are processed according to a procedure similar to that described in Examples 1-10, except that in Examples 33-34, no polyhydroxy curing agent was added to the composition and the organic peroxide and triallylisocyanurate curing agents were added after the nylon and PEBAX (instead of the organo-onium compound). The physical properties of the FTPE compositions were evaluated according to the procedures described above and the results are summarized in Table 12 along with the compositions used in the Examples.

TABLE 12

| Ingredients (g) | Example 32 | Example 33 | Example 34 |
|---|---|---|---|
| FE-2[a] | 100 | | |
| FE-3[a] | | 100 | 100 |
| CaO | 3 | | |
| Ca(OH)$_2$ | 4.5 | | |
| Bisphenol AF | 1.9 | | |
| Tributylallyl phosphonium chloride[b] | 0.38 | | |
| Organic peroxide[c] | | 4 | 4 |
| Triallylisocyanurate[d] | | 5.6 | 5.6 |
| Carbon black N-326 | 1 | 1 | 1 |
| AEROSIL R-972[e] | | 3 | 3 |
| Nylon 612[f] | 17 | | |
| Nylon 610[g] | | 23 | 23 |
| PEBAX 5533[h] | 11 | 8 | 8 |
| PEBAX 2533[h] | 4 | 3 | 3 |
| TR 065[i] | 2 | 1 | 1 |
| TR 044[i] | 1 | | |
| Sodium stearate | | 1 | 1 |
| HSN stabilizer[j] | | 0.46 | 0.46 |
| AGERITE DPPD[k] | 1.0 | | |
| AGERITE WHITE[k] | | 1.0 | 0 |

[a]Please refer to Table 4.
[b]Contains 0.27 g silica and 0.25 g sulfolane in addition to the tributylallyl phosphonium chloride.
[c]Alpha, alpha'-bis(tert.-butyl peroxy) diisopropyl benzene, 40% active product on burgess KE clay carrier, commercially available from Hercules, Inc. as VUL-CUP 40 KE.
[d]A 72% active product on inorganic carrier MICROCEL E, commercially available from Natrochem as TAIC-DLC.
[e]Silane-treated fumed silica available from DeGussa.
[f]Nylon 612 containing 2% of HSN concentrate, (a heat stabilizer/antioxidant for nylon added by the producer, Texapol), commercially available as TEXALON 1800 HS.
[g]Nylon 610, commercially available as TEXALON 1600 AL from the Texapol Corporation.
[h]TPEs described in Table 2.
[i]Flow enhancers commercially available from the Struktol Company.
[j]An antioxidant for nylon commercially available from the Texapol Corporation.
[k]Described in Table 6 as amines "A2" and "A1" respectively.

TABLE 13

| Physical Properties | Example 32 | Example 33 | Example 34 |
|---|---|---|---|
| Tensile strength, MPa | 11.0 | 8.55 | 5.72 |
| Elongation, % | 273 | 124 | 45 |
| Compression set, % (70 hrs @ 150° C.) | 86 | 103 | 108 |
| Hardness, Shore D | 40 | 41 | 44 |
| Wt. loss @ 260° C., % | | | |
| 1 hour | 0.8 | 1.0 | 1.6 |
| 22 hours | 4.3 | 6.6 | 6.5 |

The results show that the fluoroelastomers evaluated herein are useful in the FTPE compositions. Examples 33 and 34 show that addition of an amine compound enhances the tensile strength, elongation and short term thermal stability of the peroxide cured composition.

EXAMPLES 6C-7C

The following examples illustrate the importance of dynamically vulcanizing the FTPE compositions. Two compositions were prepared.

A blend of AFLAS 150P (fluoroelastomer described in Table 4 as FE-4) and PEBAX 5533 (a TPE described in Table 2) was prepared according to Example 12 of Japanese Patent Application JP 63-81159 (Example 6C). Another Example was prepared according to the procedure of Example 12 of the 159 application, but the ratio of AFLAS 150P and PEBAX 5533 was raised to be more like the ratios used in this invention. Neither composition is dynamically vulcanized. The physical properties of each mixture were evaluated according to the procedures described above. The data from the evaluation are summarized in Table 14.

The data show that when the level of fluoroelastomer is increased (e.g. to improve the chemical resistance and thermal stability of the composition) the tensile strength and elongation of the composition is greatly reduced. Thus, it would not be obvious from the teachings of the '159 application to create the FTPE compositions of this invention which contain a cured, dispersed fluoroelastomer phase as the major component by weight of the composition. Additionally, the compositions of Examples 6C and 7C melted at 177° C. Thus, such compositions will not possess the continuous high temperature service life of the FTPE compositions of this invention.

TABLE 14

| Ingredients | 6C | 7C |
|---|---|---|
| Fluoroelastomer FE-4[a] | 50% | 76% |
| FEBAX 5533 | 50% | 24% |
| Physical properties | | |
| Hardness, Shore D | 45 | 32 |
| Tensile, MPa | 13.0 | 4.43 |
| Elongation, % | 482 | 262 |
| Compression set | | |
| 70 hrs @ 150° C., % | 93 | 112 |
| 70 hrs @ 177° C., % | melted | melted |

EXAMPLE 35

This example illustrates the utility of the TPE ARNITEL EM 400 (a TPE described in Table 2) in the FTPE compositions of this invention. The FTPE composition (summarized in Table 15) was prepared according to a procedure similar to that described in Examples 1–10. The physical properties were evaluated according to the procedures described above.

TABLE 15

| Ingredients (g) | |
|---|---|
| FE-1[a] | 100 |
| CaO | 3 |
| Ca(OH)$_2$ | 4 |
| Bisphenol AF | 1.25 |
| Tributylallyl phosphonium chloride[b] | 0.36 |
| Carbon black N-326 | 1 |
| Nylon 612[c] | 11 |
| ARNITEL EM 400[d] | 11 |
| TR 065[e] | 1.0 |
| AGERITE DPPD[f] | 1.0 |
| Physical Properties | |
| Tensile Strength, MPa | 10.7 |
| Elongation, % | 271 |
| Compression set, % (70 hrs at 150° C.) | 78 |
| Hardness, Shore D | 36 |
| Wt. loss @ 260° C., % | |
| 1 hour | 1.2 |
| 22 hours | 7.0 |

[a]Fluoroelastomer is described in Table 4.
[b]0.27 g silica and 0.25 g sulfolane present in addition to tributylallyl phosphonium chloride.
[c]TEXALON 1800 described in Table 1.
[d]TPE described in Table 2.
[e]STRUKTOL TR 065 commercially available from the Struktol Company.
[f]Described in Table 6 as amine "A2".

EXAMPLE 36

The following example illustrates one method of making FTPE compositions using ground, pre-cured fluoroelastomer composition purchased from a supplier. It is believed that the fluoroelastomer composition summarized in Table 16 is correct, although the composition was not chemically analyzed. The FTPE composition was prepared by preheating a Haake Rheocord Rheometer to about 230° C. and charging the nylon 612 (TEXALON 1800, described in Table 1) and PEBAX 4011 (a TPE described in Table 2) to the mixer which was operated at about 75 rpm. After about three minutes, the pre-ground, cured fluoroelastomer composition was added to the mixer. After an additional four minutes, the AGERITE DPPD (described in Table 6 as amine "A2") and TR 065 (commercially available as STRUKTOL TR 065 from the Struktol Company) were added to the mixer. The composition was discharged from the mixer after ten minutes total mix time.

The physical properties of the FTPE composition were evaluated according to the methods described above. The FTPE composition and its physical properties are summarized in Table 16.

TABLE 16

| Ingredients (g) | |
|---|---|
| Cured fluoroelastomer composition[a] | 147 |
| Nylon 612 | 14 |
| PEBAX 4011 | 8 |
| AGERITE DPPD | 1 |
| TR 065 | 1 |
| Physical properties | |
| Tensile strength, MPa | 9.5 |
| Elongation, % | 111 |
| Compression set 70 hrs @ 150° C. | 71 |
| Hardness, Shore D | 49 |
| Weight loss 260° C., % | |
| 1 hour | 1.9 |
| 22 hours | 11.7 |

[a]Cured fluoroelastomer composition contains about 102 g of FE-5 (fluoroelastomer described in Table 4) crosslinked with bisphenol AF and triphenylbenzyl phosphonium chloride, and containing 30 g carbon black N-990, and 9 g of inorganic acid acceptors.

The data show that FTPE compositions having useful physical properties can be prepared using fluoroelastomer composition cured ex-situ. Note that the AGERITE DPPD was added with the nylon 612 and PEBAX 4011. Generally, it is preferred to add the amine compound with the fluoroelastomer gum when dynamically vulcanizing FTPE compositions to get more efficient usage of the amine compound.

Other variations are possible without departing from the scope of this invention.

What is claimed is:

1. Fluorine-containing, thermoplastic elastomer compositions comprising:
    (A) a continuous phase comprising the minor portion of the composition by weight, the continuous phase comprising:
        (1) about 0 to 90 weight percent of thermoplastic polymer having a melt temperature or glass transition temperature greater than about 150° C. that is selected from the group consisting of: linear aliphatic polyamides, polyalkyleneterephthalates, polyimides, polyamideimides, polysulfones, polyetherimides, polycarbonates, polyethersulfones, polyetherketones, polyphenylenes, poly(phenylene sulfides), poly(phenylene oxides), polyetherether ketones and mixtures thereof; and
        (2) about 10 to 100 weight percent of thermoplastic elastomer that is selected from the group consisting of block copolymers having polyester and polyether blocks, polyamide and polyether blocks, and mixtures of such block copolymers and has a melt temperature greater than about 145° C.; and
    (B) a disperse phase comprising the major portion of the composition by weight, the disperse phase comprising particles or domains of cured, fluorinated elastomer composition, wherein the fluorinated elastomer composition comprises an elastomer copolymer of one or more ethylenically unsaturated fluoromonomers and, optionally, one or more olefin monomers.

2. The fluorine-containing, thermoplastic elastomeric composition according to claim I wherein the disperse phase consists essentially of particles or domains of cured fluoroelastomer composition.

3. The fluorine-containing, thermoplastic elastomeric composition according to claim 1 wherein the domains or particles of cured, fluoroelastomer composition are prepared by cross-linking a curable, fluoroelastomer composition comprising: fluoroelastomer gum, polyhydroxy compound, organo-onium compound and acid acceptor.

4. The fluorine-containing thermoplastic elastomeric composition according to claim 3 wherein the organo-onium compound is selected from the group consisting of tetrabutylammonium chloride, tetrabutylammonium bromide, tetrahexylammonium chloride, tetraheptylammonium chloride, triphenylbenzylphosphonium chloride, tetrapentylammonium chloride, tributylallylphosphonium chloride, tributylbenzylphosphonium chloride, dibutyldiphenylphosphonium chloride, tetrabutylphosphonium chloride and tributyl(2-methoxy)propylphosphonium chloride, phenyltrimethylammonium chloride, tetrapropylammonium bromide, tetraheptylammonium bromide, tetramethylphosphonium chloride, tetramethylammonium chloride, tetraphenylphosphonium chloride, tetraphenylarsonium chloride, tetraphenylstibonium chloride, 8-benzyl-1,8-diazobicyclo[5.4.0]7-undecenium chloride, benzyltris(dimethylamino)phosphonium chloride, bis(benzyldiphenylphosphine) iminium chloride compounds, and mixtures thereof.

5. The fluorine-containing thermoplastic elastomeric composition according to claim 3 wherein the polyhydroxy compound is selected from the group consisting of isopropylidene-bis(4-hydroxybenzene), hexafluoroisopropylidene-bis(4-hydroxybenzene) and mixtures thereof.

6. The fluorine-containing, thermoplastic elastomeric composition according to claim 3 wherein the curable, fluoroelastomer composition further comprises amine compound.

7. The fluorine-containing, thermoplastic elastomeric composition according to claim 6 wherein the amine compound can be represented by the formula:

where:

R¹ is independently selected from substituted and unsubstituted alkyl, aryl, aralkyl, and alkaryl groups;

R² is independently selected from H, and substituted and unsubstituted alkyl, aryl, aralkyl and alkaryl groups;

R³ is selected from substituted or unsubstituted arylene, alkylene, alkarylene, and aralkylene groups;

n is a number from 0 to 3;

at least one R¹, R² or R³ group will be an aryl group or a group containing one or more aryl moieties; and no amino nitrogen atom will be bonded directly to the methylene carbon atom of a arylmethylene group.

8. The fluorine-containing thermoplastic composition according to claim 7 wherein each amino nitrogen atom is bonded to an aryl group or a group containing one or more aryl moieties.

9. The fluorine-containing thermoplastic elastomeric composition according to claim 6 wherein the amine compounds are selected from the group consisting of: $C_{10}H_7$—NH—$C_6H_4$—NH—$C_{10}H_7$, $C_6H_5$—NH—$C_6H_4$—NH—$C_6H_5$, $CH_3(CH_2)_6NH$—$C_6H_4$—NH$(CH_2)_6CH_3$, $C_6H_5$—NH—$CH_2CH_2$—NH—$C_6H_5$, p—Cl—$C_6H_4$—N($C_6H_5$)—$C_6H_5$)N—H$_4$—$C_6$—Cl—p, $(CH_3)_2N$—$C_6H_4$—N$(CH_3)_2$, $C_6H_5$—NH—$C_6H_5$, and mixtures thereof.

10. The fluorine-containing, thermoplastic elastomeric composition according to claim 1 wherein the domains or particles of cured, fluoroelastomer composition are prepared by cross-linking a curable, fluoroelastomer composition comprising: fluoroelastomer gum, peroxide curative and cocuring agent.

11. The fluorine-containing, thermoplastic elastomeric composition according to claim 10 wherein the curable, fluoroelastomer composition further comprises amine compound.

12. The fluorine-containing, thermoplastic elastomeric composition according to claim 10 wherein the amine compound can be represented by the formula:

where:

R¹ is independently selected from substituted and unsubstituted alkyl, aryl, aralkyl, and alkaryl groups;

R² is independently selected from H, and substituted and unsubstituted alkyl, aryl, aralkyl and alkaryl groups;

R³ is selected from substituted or unsubstituted arylene, alkylene, alkarylene, and aralkylene groups;

n is a number from 0 to 3;

at least one R¹, R² or R³ group will be an aryl group or a group containing one or more aryl moieties; and no amino nitrogen atom will be bonded directly to the methylene carbon atom of a arylmethylene group.

13. The fluorine-containing thermoplastic composition according to claim 12 wherein each amino nitrogen atom is bonded to an aryl group or a group containing one or more aryl moieties.

14. The fluorine-containing thermoplastic elastomeric composition according to claim 11 wherein the amine compounds are selected from the group consisting of $C_{10}H_7$—NH—$C_6H_4$—NH—$C_{10}H_7$, $C_6H_5$—NH—$C_6H_4$—NH—$C_6H_5$, $CH_3(CH_2)_6NH$—$C_6H_4$—NH$(CH_2)_6CH_3$, $C_6H_5$—NH—$CH_2CH_2$—NH—$C_6H_5$, p—Cl—$C_6H_4$—N($C_6H_5$)—$C_6H_5$)N—H$_4$—$C_6$—Cl—p, $(CH_3)_2N$—$C_6H_4$—N$(CH_3)_2$, $C_6H_5$—NH—$C_6H_5$, and mixtures thereof.

15. The fluorine-containing thermoplastic elastomeric composition according to claim 1 prepared by dynamic vulcanization.

16. The fluorine-containing, thermoplastic elastomeric composition according to claim 1 prepared by:
(a) preparing a mixture comprising: fluoroelastomer gum, polyhydroxy compound and acid acceptor;
(b) at a temperature at or above the glass transition or melting temperatures of the thermoplastic polymer and thermoplastic elastomer, adding thermoplastic polymer and thermoplastic elastomer to the mixture prepared in step (a);
(c) adding organo-onium compound to the mixture resulting from step (b); and
(d) mixing the mixture resulting from step (c) until the fluoroelastomer has substantially crosslinked and formed a disperse phase of domains or particles in the continuous phase, the domains having an average size of no more than 20 microns.

17. The fluorine-containing, thermoplastic elastomeric composition according to claims 16 wherein the mixture prepared in step (a) further comprises amine compound.

18. The fluorine-containing, thermoplastic elastomer according to claim 16 wherein the domains or particles have an average size of no more than 15 microns.

19. The fluorine-containing, thermoplastic elastomer according to claim 16 wherein the domains or particles have an average size of no more than 5 microns.

20. The composition according to claim 1 wherein the thermoplastic polymer (A)(1) is a polyamide and the thermoplastic elastomer (A)(2) is a block copolymer having polyether and polyamide blocks.

* * * * *

UNITED STATES PATENT AND TRADEMARK OFFICE
CERTIFICATE OF CORRECTION

PATENT NO. : 5,371,143

DATED : December 6, 1994

INVENTOR(S) : Novak et al.

It is certified that error appears in the above-indentified patent and that said Letters Patent is hereby corrected as shown below:

Col. 5, line 18, "344" should be --334--.

Col. 5, line 33, "n." should be -- n˙--.

Col. 5, line 45, "Properties" should be --properties--.

Col. 5, line 50, "Preferably" should be --preferably--.

Col. 7, line 53, "tbutylperoxy" should be --t-butylperoxy--.

Col. 8, line 52, "Kirk-Othmer" should be --Kirk-Othmer--.

Col. 9, line 13, "benzYldiphenylphosphine" should be --benzyldiphenylphophine--.

Col. 9, line 54 and col. 10, line 23, "moleties" should be --moieties--.

UNITED STATES PATENT AND TRADEMARK OFFICE
CERTIFICATE OF CORRECTION

PATENT NO. : 5,371,143
DATED : December 6, 1994
INVENTOR(S) : Novak et al.

It is certified that error appears in the above-indentified patent and that said Letters Patent is hereby corrected as shown below:

Col. 10, line 60, "antioxidant nylon" should be --antioxidant for nylon--.

Col. 12, line 22, "Proportions" should be --proportions--.

Col. 14, line 40, "with of" should be --with--.

Col. 17, line 32, "burgess" should be --Burgess--.

Col. 18, line 1, "159" should be --'159--.

At col. 18, line 34, insert --a Please refer to Table 4.--.

Col. 20,
Claim 2, line 2, "I" should be --1--.

Col. 21,
Claim 7, line 19, "moleties;" should be --moieties;--.

Claim 8, line 4, "moleties." should be --moieties.--.

UNITED STATES PATENT AND TRADEMARK OFFICE
CERTIFICATE OF CORRECTION

PATENT NO. : 5,371,143
DATED : December 6, 1994
INVENTOR(S) : Novak et al.

It is certified that error appears in the above-indentified patent and that said Letters Patent is hereby corrected as shown below:

Column 21,

Claim 9, line 7, "$C_6H_5$)" should be --$C_6H_4$-($C_6H_5$)--.

Column 22,

Claim 14, line 7, "$C_6H_5$) should be --$C_6H_4$-($C_6H_5$)--.

Claim 16, line 10, please line (C) up with (A), (B) and (D).

Signed and Sealed this

Sixth Day of June, 1995

Attest:

BRUCE LEHMAN

*Attesting Officer*   *Commissioner of Patents and Trademarks*